US011541578B2

(12) United States Patent
Tabanelli (10) Patent No.: US 11,541,578 B2
(45) Date of Patent: Jan. 3, 2023

(54) APPARATUS AND METHOD FOR HEATING PIPES MADE OF THERMOPLASTIC MATERIAL

(71) Applicant: SICA S.p.A., Alfonsine (IT)

(72) Inventor: Giorgio Tabanelli, Cotignola (IT)

(73) Assignee: SICA S.P.A., Alfonsine (IT)

( * ) Notice: Subject to any disclaimer, the term of this patent is extended or adjusted under 35 U.S.C. 154(b) by 326 days.

(21) Appl. No.: 16/331,829

(22) PCT Filed: Oct. 11, 2017

(86) PCT No.: PCT/IB2017/056279
§ 371 (c)(1),
(2) Date: Mar. 8, 2019

(87) PCT Pub. No.: WO2018/073695
PCT Pub. Date: Apr. 26, 2018

(65) Prior Publication Data
US 2019/0248048 A1    Aug. 15, 2019

(30) Foreign Application Priority Data

Oct. 18, 2016  (IT) .................. 102016000104755

(51) Int. Cl.
*B29C 57/02*     (2006.01)
*B29C 35/08*     (2006.01)
(Continued)

(52) U.S. Cl.
CPC .......... *B29C 35/0805* (2013.01); *B29C 57/02* (2013.01); *B29C 2035/0822* (2013.01); *B29K 2701/12* (2013.01); *B29L 2023/22* (2013.01)

(58) Field of Classification Search
CPC .............. B29C 35/0805; B29C 57/02; B29C 2035/0822; B29C 65/1412; B29B 13/024;
(Continued)

(56) References Cited

U.S. PATENT DOCUMENTS 2,478,711 A * 8/1949 Robinson .............. F26B 21/006
118/DIG. 10
3,728,059 A    4/1973 De Putter
(Continued)

FOREIGN PATENT DOCUMENTS

CN    204773202 U    11/2015
EP      700771 A1     3/1996
(Continued)

OTHER PUBLICATIONS

International Search Report and Written Opinion dated Nov. 15, 2018 for counterpart PCT Application No. PCT/IB2017/056279.
(Continued)

*Primary Examiner* — Joseph S Del Sole
*Assistant Examiner* — Margaret B Hayes
(74) *Attorney, Agent, or Firm* — Shuttleworth & Ingersoll, PLC; Timothy J. Klima (57) ABSTRACT

An apparatus for internal heating of end portions of pipes made of thermoplastic material having a central axis including a heating element, designed to be inserted at least partially inside an end portion of a pipe made of thermoplastic material for heating an inner cylindrical surface of the portion, the heating element including an infra-red radiation unit designed to face at least partially the inner cylindrical surface.

17 Claims, 10 Drawing Sheets

(51) Int. Cl.
*B29K 701/12* (2006.01)
*B29L 23/00* (2006.01)

(58) Field of Classification Search
CPC .......... B29B 13/025; H05B 3/40; H05B 3/42; H05B 3/0038
USPC ........... 392/411, 412, 413, 424, 425; 219/67
See application file for complete search history.

(56) References Cited

U.S. PATENT DOCUMENTS

| | | | | |
|---|---|---|---|---|
| 3,892,509 | A * | 7/1975 | Ruegg | B29C 45/68 425/154 |
| 4,166,556 | A * | 9/1979 | Annas, Sr. | D06H 3/16 223/112 |
| 5,256,341 | A * | 10/1993 | Denis | B29B 13/024 392/407 |
| 5,587,019 | A * | 12/1996 | Fujie | C23C 16/48 118/728 |
| 6,724,984 | B2 * | 4/2004 | Kakuya | H05B 3/0033 34/96 |
| 2001/0031291 | A1 * | 10/2001 | Takada | B29C 49/06 425/533 |
| 2006/0157896 | A1 * | 7/2006 | Lee | H05B 3/0033 34/96 |
| 2017/0043522 | A1 * | 2/2017 | Tabanelli | C23C 16/48 118/728 |

FOREIGN PATENT DOCUMENTS

| | | | | |
|---|---|---|---|---|
| GB | 926393 | A * | 5/1963 | ............. B29C 48/03 |
| GB | 926393 | A | 5/1963 | |
| IT | 1171936 | | 6/1983 | |
| IT | 1171936 | B | 6/1987 | |
| JP | H10682 | A | 1/1998 | |
| JP | 2001074182 | A | 3/2001 | |
| WO | 9942279 | A1 | 8/1999 | |
| WO | 2009074999 | A2 | 6/2009 | |
| WO | 2015162520 | A2 | 10/2015 | |
| WO | WO-2015162520 | A2 * | 10/2015 | ............. B29B 13/08 |

OTHER PUBLICATIONS

Chinese Office Action dated Sep. 22, 2020 from counterpart Chinese Patent Application No. 201780058678.7.
Chinese Office Action dated Jun. 24, 2021 from counterpart Chinese Patent Application No. 201780058678.7.

* cited by examiner

“APPARATUS AND METHOD FOR HEATING PIPES MADE OF THERMOPLASTIC MATERIAL

This application is the National Phase of International Application PCT/IB2017/056279 filed Oct. 11, 2017 which designated the U.S.

This application claims priority to Italian Patent Application No. 102016000104755 filed Oct. 18, 2016, which application is incorporated by reference herein.

TECHNICAL FIELD

This invention relates to an apparatus for heating pipes made of thermoplastic material.

This invention also relates to a method for heating pipes made of thermoplastic material.

More specifically, this invention relates to an apparatus for heating ends of pipes made of thermoplastic material to subject the ends to a subsequent hot plastic deformation process.

BACKGROUND ART

The apparatus is especially suitable for performing the step of heating the end of the pipe in the belling process. In effect, in the production of pipes by thermoplastic extrusion designed for making conduits for delivering and/or discharging fluids (used for example in the drainage networks, drinking water distribution networks and sewers of building works), the belling machines are used for forming an end portion of the pipes into the characteristic "bell" shape. This particular wider shape is used to connect the pipes in succession which form a conduit. An unshaped end of a pipe is normally inserted in the bell-shaped end of the adjacent pipe in the conduit.

The belling machine is normally installed along the extrusion line where it receives the cut pipes to be processed.

The majority of belling machines make the bell with the hot forming process. The belling machines are equipped with at least one oven which heats the end of the pipe, changing the wall of the end of the pipe to be shaped into a plastically deformable softened state. The machine is further equipped with forming equipment which, by using a suitable mould, forms the heated end of the pipe into a bell shape. The bell shaped on the mould is generally cooled inside the same forming equipment.

The most commonly used thermoplastic materials in pipe systems are unplasticised polyvinyl chloride (PVC-U), polypropylene (PP) and high-density polyethylene (HDPE).

The state of optimum plastic deformability and therefore the final thermal state of the pipe before the belling process depends on the material, the shape of the bell, the wall thickness of the pipe, the dimensions specified for the bell and the characteristics of the forming and cooling method.

The PVC-U thermoplastic material is a substantially amorphous material which at ambient temperature exhibits a fragile mechanical behaviour similar to glass; at temperatures greater than 75° C.–80° C. (vitreous transition temperature Tg) the PVC-U starts to soften, exhibiting a plastic rubbery behaviour. Normally, with the PVC-U pipe the belling step allows a relatively large optimum thermal heat state range. The optimum temperatures for a belling process of the PVC-U pipe are approximately between 90° C. and 125° C. The temperature does not necessarily need to be uniform along the axis of the pipe and in the thickness, the temperature distribution depending on the specified shape and dimensions of the bell, the wall thickness of the pipe, the properties of the forming and/or cooling method, and economic choices correlated with the simplicity of the heating and forming apparatus.

The PP and HDPE pipes for which the bell-shaped joint is required are mainly applied in pipe systems for the drainage of buildings.

The pipes of these systems are small in diameter, normally from 32 mm up to 160 mm and short in length, normally from 0.15 m to 3 m. Compared with PVC-U pipes, the belling techniques of PP and HDPE pipes are different and more complex. In fact, at ambient temperature these materials are semi-crystalline, that is to say, there coexists in them an ordered macromolecular crystalline configuration and a disordered amorphous macromolecular configuration. At ambient temperature the amorphous part is in a viscous liquid state, so the ambient temperature is greater than the vitreous transition temperature of the amorphous part of the material. At ambient temperature, PP and HDPE exhibit a ductile and tough mechanical behaviour. Unlike PVC-U, PP and HDPE have a melting temperature, that is to say, a temperature above which there is a destruction of the crystalline mesh and the change of state from solid to liquid. The melting temperature of PP is approximately 165° C., whilst that of HDPE is approximately 134° C.

The change from the solid state to the liquid state is sudden and occurs in a very small temperature range equal to approximately ±1° C. At temperatures higher than melting temperature the process of forming the bell in the hot state cannot be performed.

Therefore, the optimum thermal state for the belling of PP and HDPE pipes is certainly less than the melting temperature.

The shaping of the bell in PP and HDPE pipes occurs with material which exhibits a viscoelastic and viscoplastic mechanical behaviour, so, unlike PVC-U pipes, the elastic behaviour of the material in the mechanical shaping deformation is not negligible.

With temperatures which are too low the plastic deformability of the material can be insufficient to form the shape of the bell, or, even if it can be formed, the resulting bell is subject to shrinkage phenomena due to the memory of the initial dimensions of the pipe, the shrinkage effects increasing the greater is the elastic part of the deformation made during the forming step.

For this reason, in the belling process for PP and HDPE pipes, the hot working temperature can vary within a very small range, approximately ±2° C. around the predetermined optimum value. Therefore, compared with PVC-U pipes, the most common belling processes applied to PP and HDPE pipes require a temperature distribution along the axis of the pipe, in the circumference and in the thickness of the wall which is almost uniform, as with different temperatures in various zones of the pipe there would be a different behaviour with the shrinkage of the various zones of the bell and, consequently, an unacceptable distortion in shape and a dimensional instability of the bell.

For the above-mentioned reasons, contact heating ovens are widely applied in the belling machines for PP and HDPE pipes. The contact ovens are substantially configured with metallic masses which adhere to the surface of the end of the pipe. The metallic masses are thermo-controlled, that is to say, they are maintained at a precise temperature and transfer the heat to the wall of the pipe by conduction. Normally, the contact oven is configured with shells which enclose the outside of the wall of the pipe. A spindle which heats again by contact or a device which operates with a different heat transmission system can be inserted inside the pipe in the same oven.

Whilst it is relatively simple to heat the outer surface of the pipe, for example with half-shells which close on the pipe, it is much more complex to achieve a heating by contact of the inner surface. In effect, due to the features of the pipe extrusion process, the wall thickness and, therefore, the inside diameter of the pipe is never as regular as the relative outside diameter; it follows that the internal heating element can if anything be close the inner wall, but not adhere to the surface. Moreover, the reduced space available inside the small diameter pipes (the commercial diameters currently start from 32 mm) makes it complex and costly to make an efficient internal heating system.

For these reasons it is normally preferred to heat the pipe mainly by external contact, adopting solutions for the internal heating that make the heating process faster and such as not create thermal discontinuities in the wall of the pipe.

For example, the internal heating is performed with systems which mainly heat by radiation with the use of measures, typically rotary devices, such as to render the heating uniform in the circumference of the pipe.

The heating which occurs mainly by external contact, with transmission of heat by conduction, is a slow heating process. In the belling machines for PP and HDPE pipes such as those described in patent documents IT 1 171 936 and EP 700 771 in the name of the same Applicant, the time necessary for forming and cooling the bell are considerably shorter than the times for heating the end of the pipe.

For example, to form a bell with a square-shaped seal seat in a PP pipe for drains of buildings having an external diameter of 110 mm with a wall thickness of 2.7 mm, a forming-cooling time of approximately 15 seconds is required, whilst the heating with contact systems makes the pipe formable in a time of not less than 45 seconds. For this reason, the belling machines for PP and HDPE pipes for drains of buildings are normally configured with a single forming-cooling station associated with several heating stations (normally 3 or 4).

Therefore, the cut pipe coming from the extrusion line is heated, at the end to be formed into a bell shape, in the various heating stations, before being inserted in the single forming and cooling station.

In the production of drain pipes for buildings, there is the need to produce short pipes with a small diameter and at the same time maintain high speed of extrusion, all this resulting in the need for high production belling machines. For this reason, the belling machines for drain pipes for buildings are conveniently configured machining in multi-belling mode.

The belling machine which operates in multi-belling mode accumulates the cut pipes arriving from the extrusion line in a group of several pipes; the group is then moved into the various work stations of the machine with the pipes of the group arranged on a horizontal plane. For example, the belling machine may be configured for simultaneously machining PP drain pipes: groups of three pipes for the diameters 32 mm, 40 mm and 50 mm; groups of two pipes for the diameters 75 mm, 90 mm and 110 mm; a single pipe for the diameters 125 mm and 160 mm.

Understandably, the simultaneous heating of several pipes in the same contact heating oven makes the belling machine even more complex and costly, especially when it is also configured with several heating stations.

Belling machines for PVC-U pipes do not have these problems even when they are designed to process drain pipes for buildings. In fact, a precise heating is not required for PVC-U pipes, unlike for PP and HDPE pipes and, therefore, hot air ovens or ovens with radiation heating elements can be conveniently used which are able to heat in an optimum manner, the PVC-U pipes, in much shorter times than that which can be achieved with contact ovens. For example, belling machines for PVC-U pipes configured with a single heating station equipped with a hot air oven, even in multi-belling mode, are able to support the same productivity as belling machines configured with three or four contact heating stations.

The hot air or radiation ovens are also usually less complex and expensive than contact ovens for multi-belling. In effect, these belling machines configured with radiation or hot air ovens can only be used for PVC-U pipes, where, on the contrary, the greatest demand for drain pipes for buildings is for PP and HDPE pipes.

To overcome these limitations, at least partly, "hybrid" machines are made with two heating stations, where the first heating station is of the hot air or radiation type, whilst the second and last station is of the contact type.

In this way, a fast, but imprecise, pre-heating is achieved with the first station, whilst the second and last contact station completes the heating bringing the end of the pipe to the precise and uniform thermal status required for PP and HDPE pipes.

The installation in the same machine of ovens of a different type, where for each station the method of positioning and movement of the pipe is also different, makes the machine complex and costly; in particular, in the hot air or irradiation station it is necessary to rotate the pipes during the heating process and this need, in the case for processing short pipes with a length of less than 0.25 m requires complex measures aimed at keeping stable the pipe being rotated.

The known methods for heating and the respective apparatuses have therefore been found to be not always satisfactory, in particular both in terms of effectiveness of the heating and excessive duration of the heating.

DISCLOSURE OF THE INVENTION

The aim of this invention is to provide an apparatus and a method for heating the end.

The invention relates to an apparatus for internal heating of end portions of pipes made of thermoplastic material which overcomes the above-mentioned drawbacks and the problems of the prior art and is at the same time effective and practical to use.

A further aim of this invention is to provide an apparatus which is able to heat in an optimum and rapid manner PP and HDPE pipes also in multi-belling mode.

Another aim of the invention is to provide an apparatus for heating pipes made of thermoplastic material which is energy efficient and at the same time allows a uniform heating of the pipes.

According to the invention, these aims are achieved by an apparatus for heating pipes comprising the technical features described in one or more of the appended claims.

BRIEF DESCRIPTION OF THE DRAWINGS

The technical features of the invention, according to the above aims, are clearly described in the appended claims and its advantages are apparent from the detailed description which follows, with reference to the accompanying drawings which illustrate non-limiting example embodiments of it, and in which:

DETAILED DESCRIPTION OF PREFERRED EMBODIMENTS OF THE INVENTION

Figure 1:
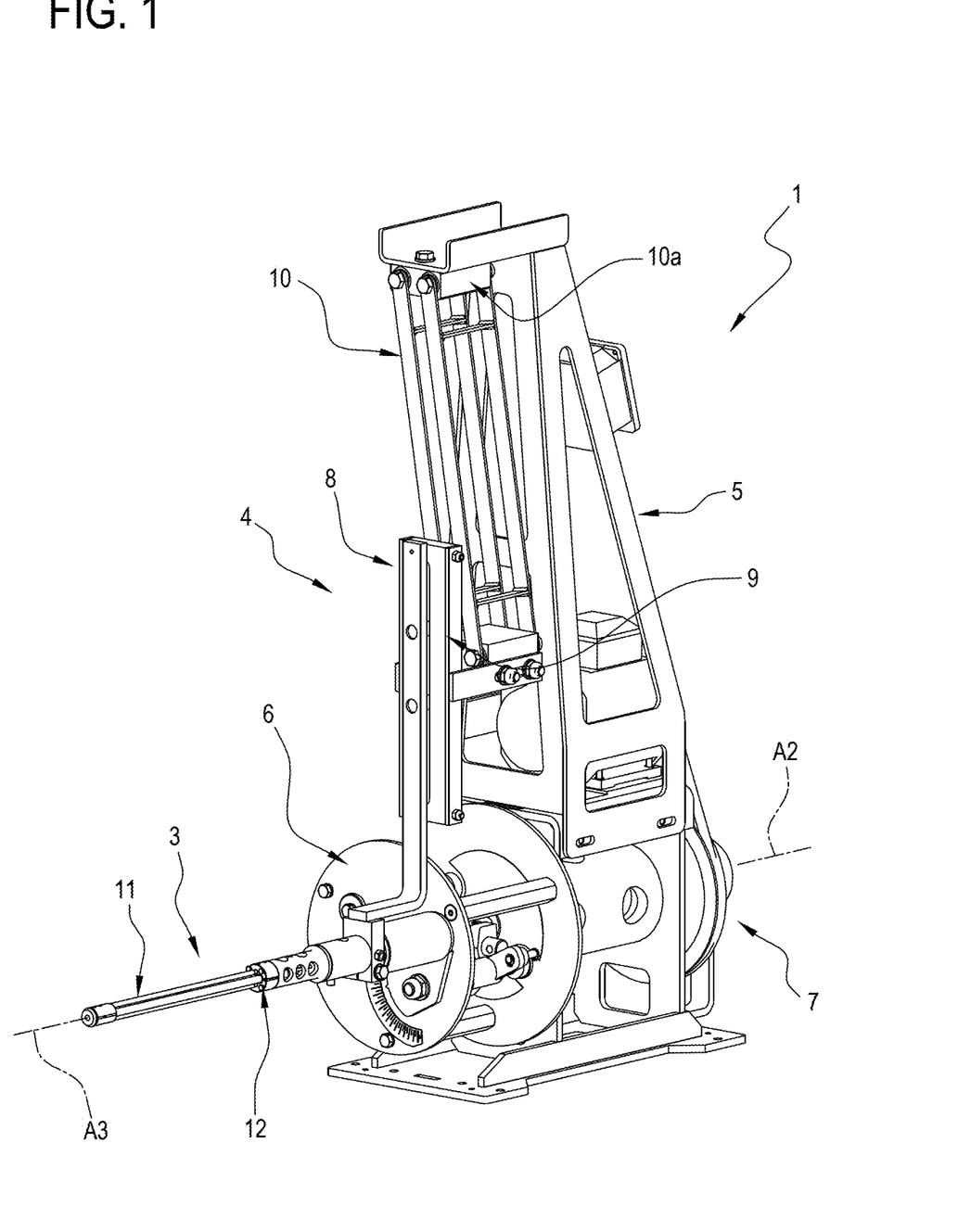
FIG. 1 is a schematic perspective view from above of a preferred embodiment of the heating apparatus according to this invention.

As illustrated in FIG. 1, the numeral 1 denotes in its entirety a preferred embodiment of the apparatus for heating inside pipes 2 made of thermoplastic material according to this invention.

The apparatus 1 illustrated in FIG. 1 is designed for heating a single pipe 2 made of thermoplastic material.

Figure 5:
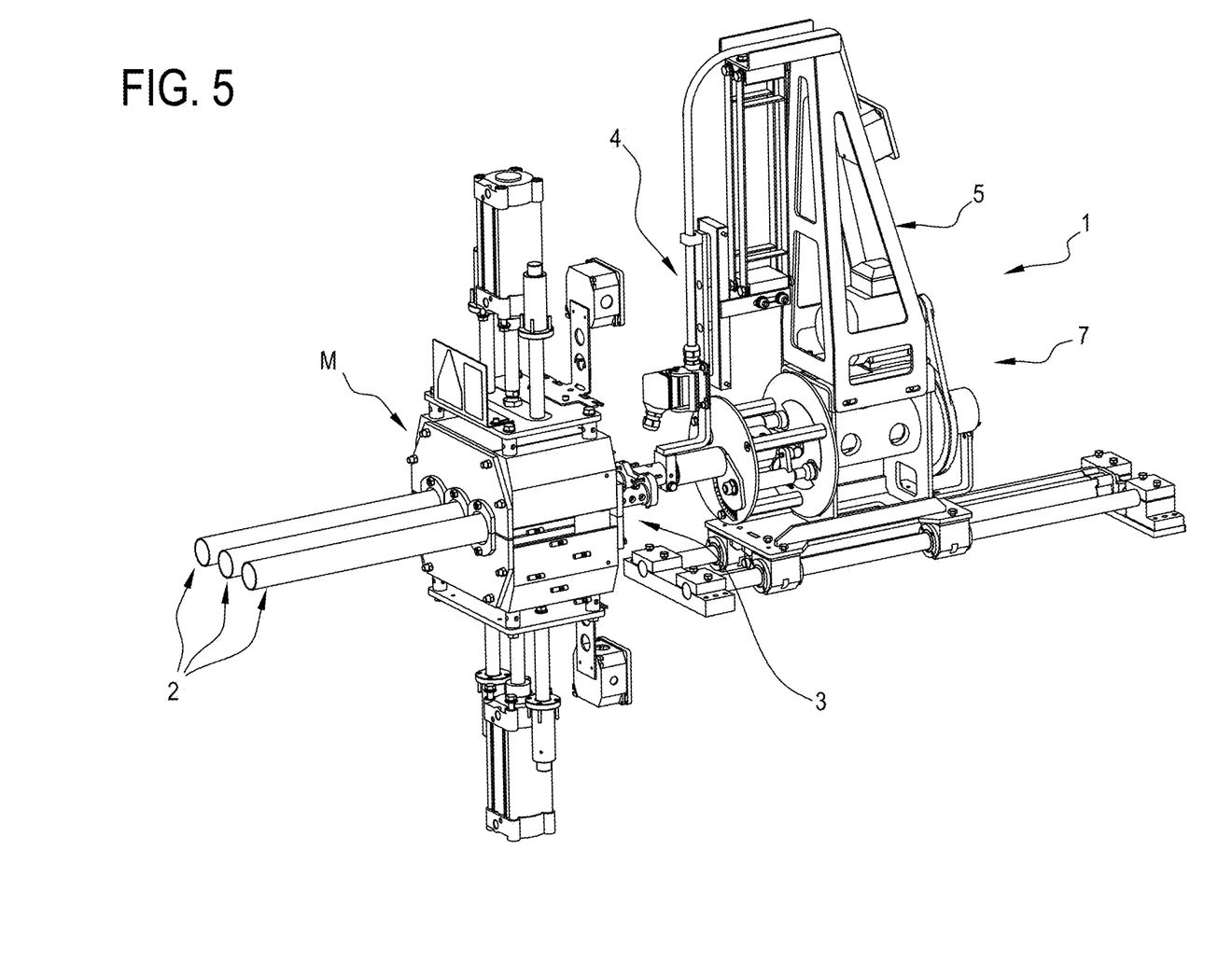
Figure 6:
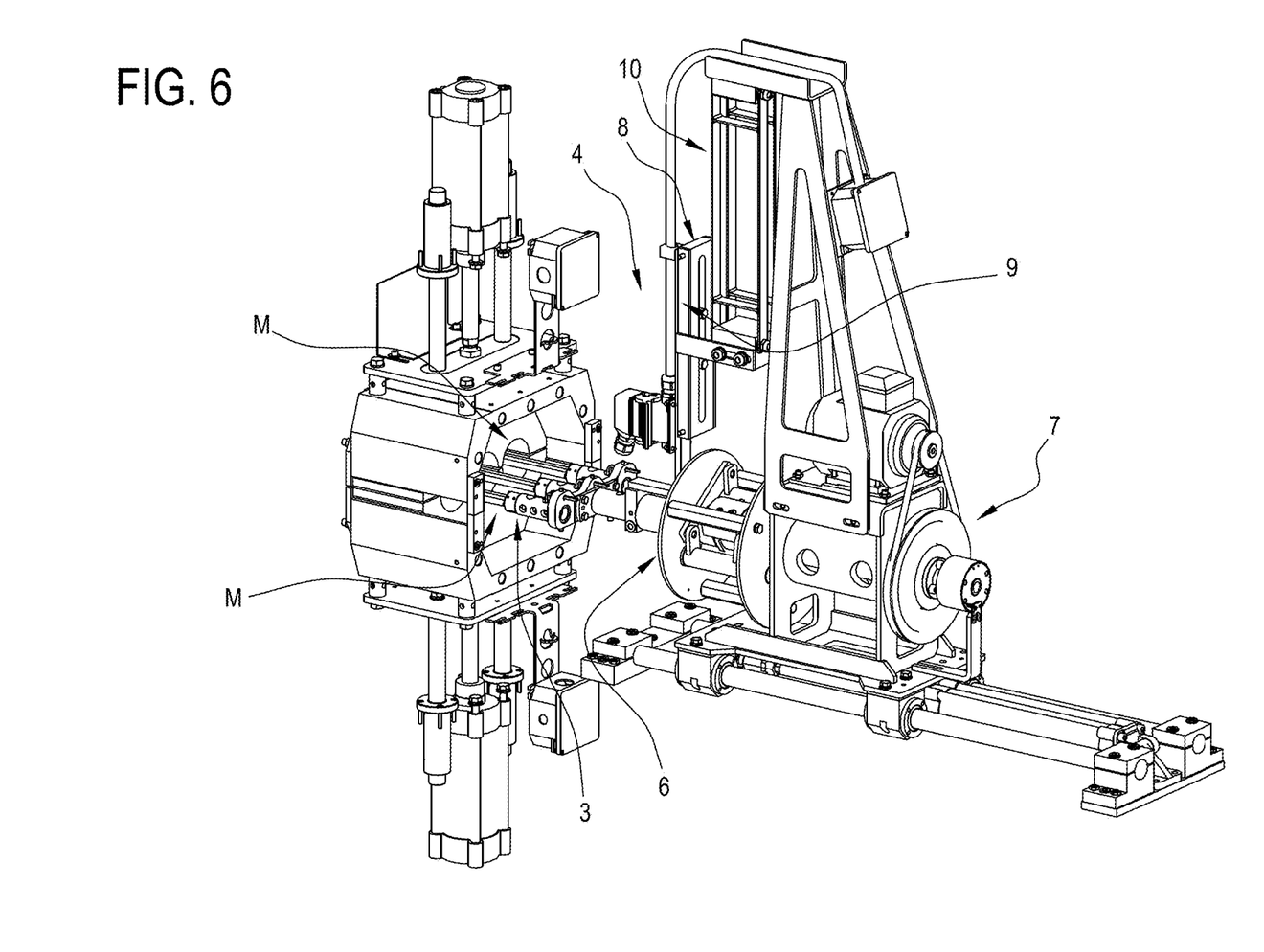

FIGS. 3 to 6 refer to a variant embodiment of the apparatus 1, designed for the simultaneous heating of a plurality of pipes 2; more specifically, as illustrated by way of example in FIG. 5, the apparatus 1 is designed for the heating of a group of three pipes 2 alongside each other in a horizontal direction.

More specifically, also as illustrated schematically in FIG. 9, the apparatus 1 comprises a heating element 3, described in more detail below, designed to be inserted partly inside an end portion 2a of a pipe 2 made of thermoplastic material for heating an inner cylindrical surface 2c of the portion 2a.

The end portion 2a of the pipe 2 is heated for being subjected to a thermoforming step, such as the forming of an end bell, not illustrated.

The pipe 2 is made of thermoplastic material and preferably of PP or HDPE and has a central axis A1.

The apparatus 1 for internal heating according to the invention is designed to be advantageously integrated in a traditional contact oven wherein metal masses M are positioned in contact externally to the above-mentioned portions 2a.

The metal masses M, of substantially known type, are maintained at a constant heat-controlled temperature and positioned in contact with the outer cylindrical surface 2e of the end 2a of the pipe 2 to be formed with a bell.

With reference to FIG. 1, the apparatus 1 comprises a heating element 3, and a movement device 4.

The movement device 4 has a frame 5.

The movement device 4 comprises, supported rotatably by the frame 5, a disc 6 rotating about a horizontal axis A2, parallel to the axis A1 of the pipe 2 being heated and motor means 7, of substantially known type and not further described, designed to rotate the disc 6.

Figure 2:
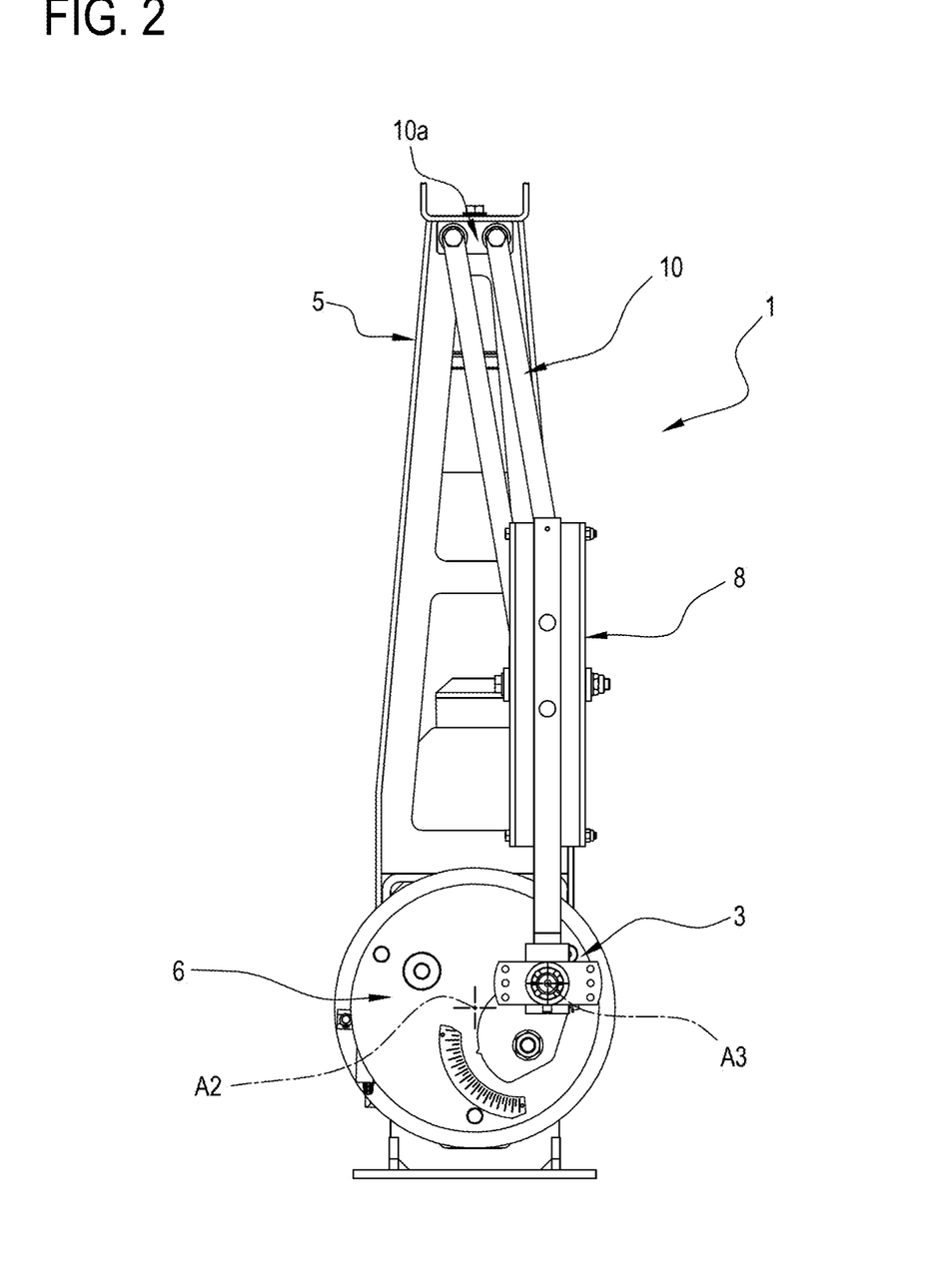
FIG. 2 is a schematic front elevation view of the apparatus of FIG. 1.
Figure 3:
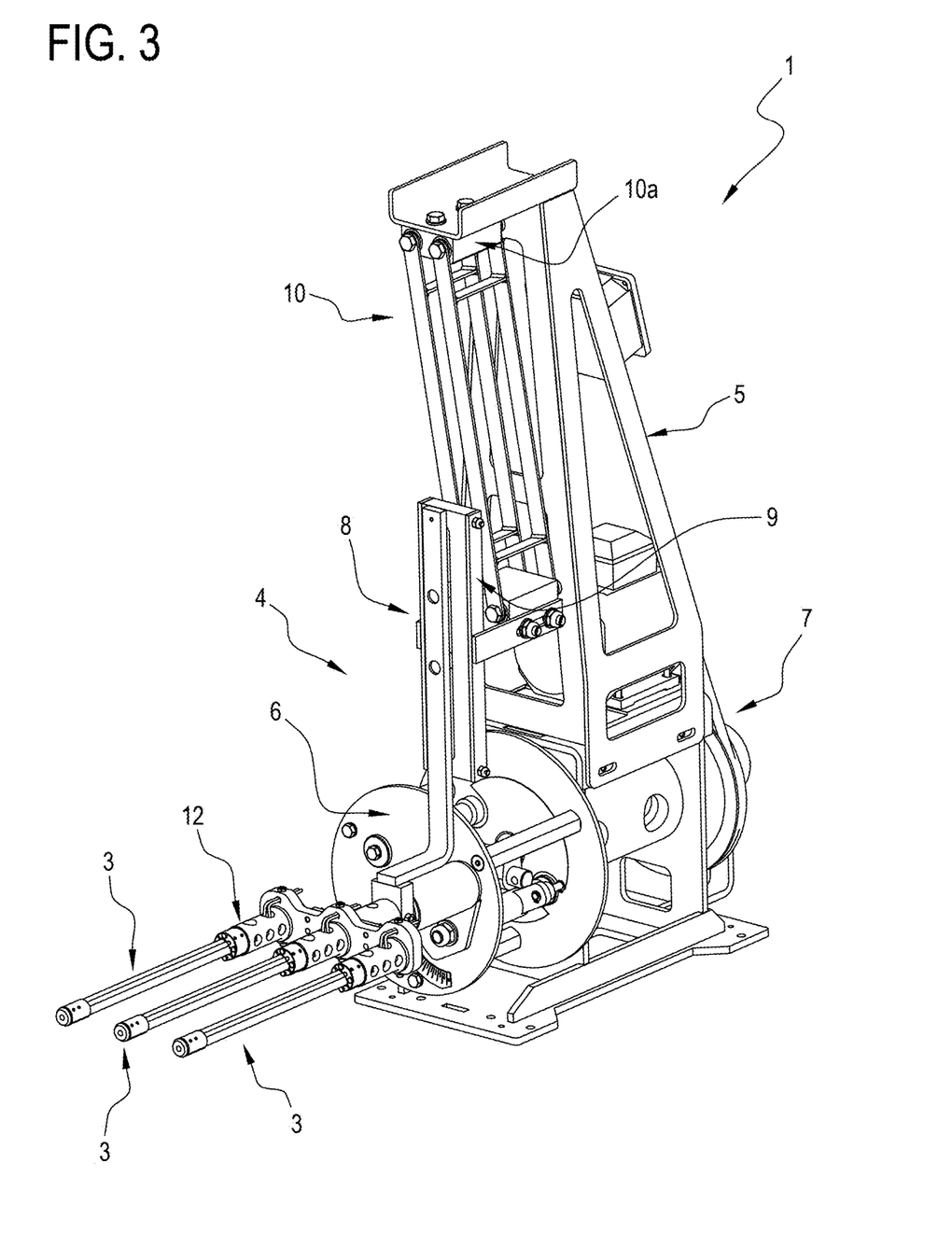
FIG. 3 is a schematic perspective view from above of a detail of a variant embodiment of the apparatus of the preceding figures.
Figure 4:
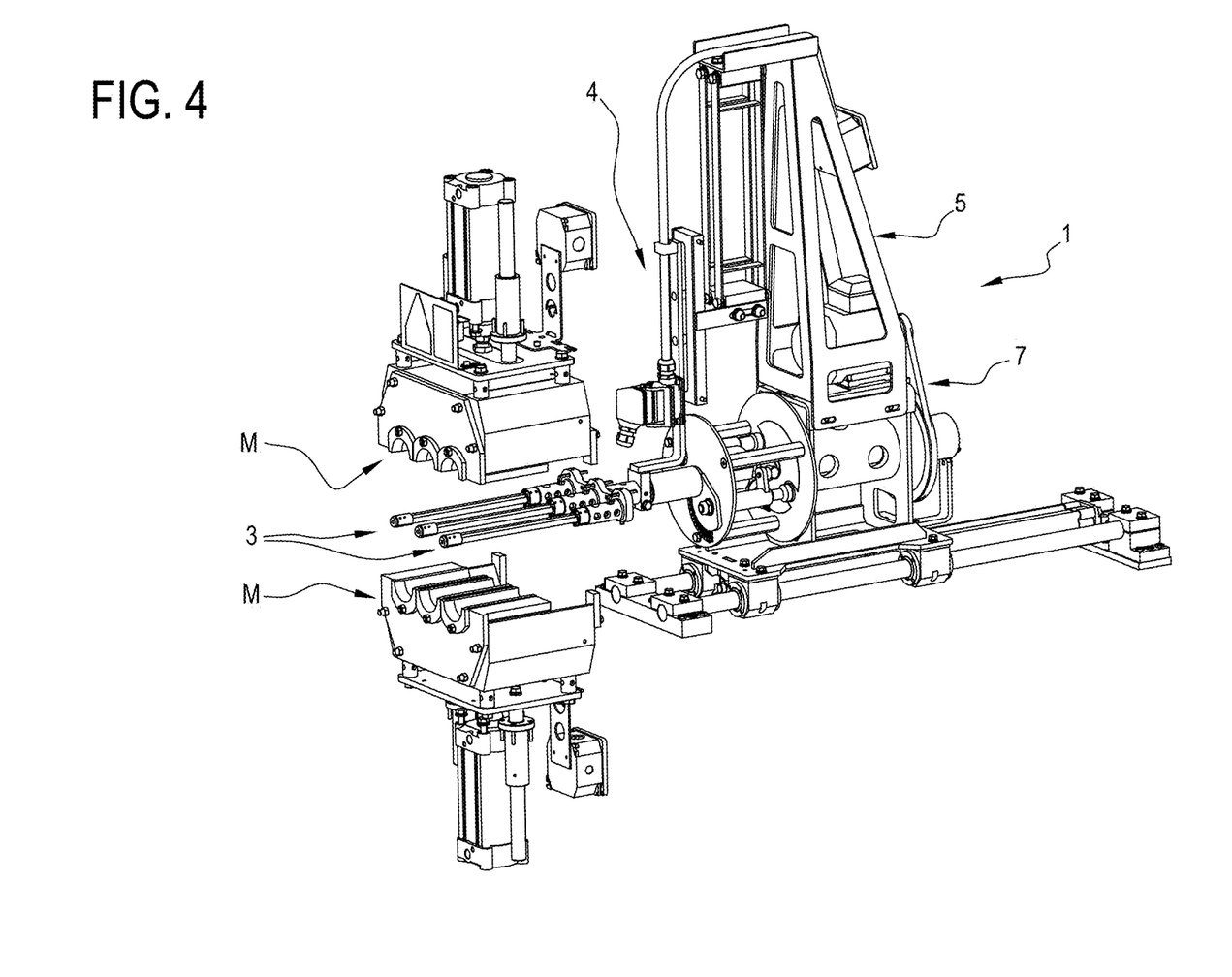
FIGS. 4 to 6 are respective schematic perspective views, from different angles, too, of the variant embodiment of FIG. 3 in different configurations of use.

In the embodiment of the apparatus 1 illustrated in FIGS. 1 and 2 designed for the heating of a single pipe 2, advantageously the axis of rotation A2 of the disc 6 coincides with the axis A1 of the pipe 2 being heated.

The heating element 3, as clearly illustrated in FIG. 2, is positioned on the disc 6 in an eccentric position, supported in a rotatably idle fashion by the disc 6.

The movement device 4 also comprises an arm 8 integral with the heating element 3 and thus also freely rotatable relative to the disc 6.

The arm 8 extends vertically above the disc 6 and operatively engages with a slider, not shown in detail, with a guide 9.

The guide 9 forms part of an articulated parallelogram 10 an upper side 10a of which is fixed to the above-mentioned fixed frame 5.

In use, during the rotation of the disc 6 about the relative axis A2, the arm 8 is slidably engaged, with the above-mentioned slider, with the guide 9. The guide 9, being constrained to the articulated parallelogram 10, forces the arm 8 to always remain parallel with itself during the rotation of the disc 6.

Figure 7:
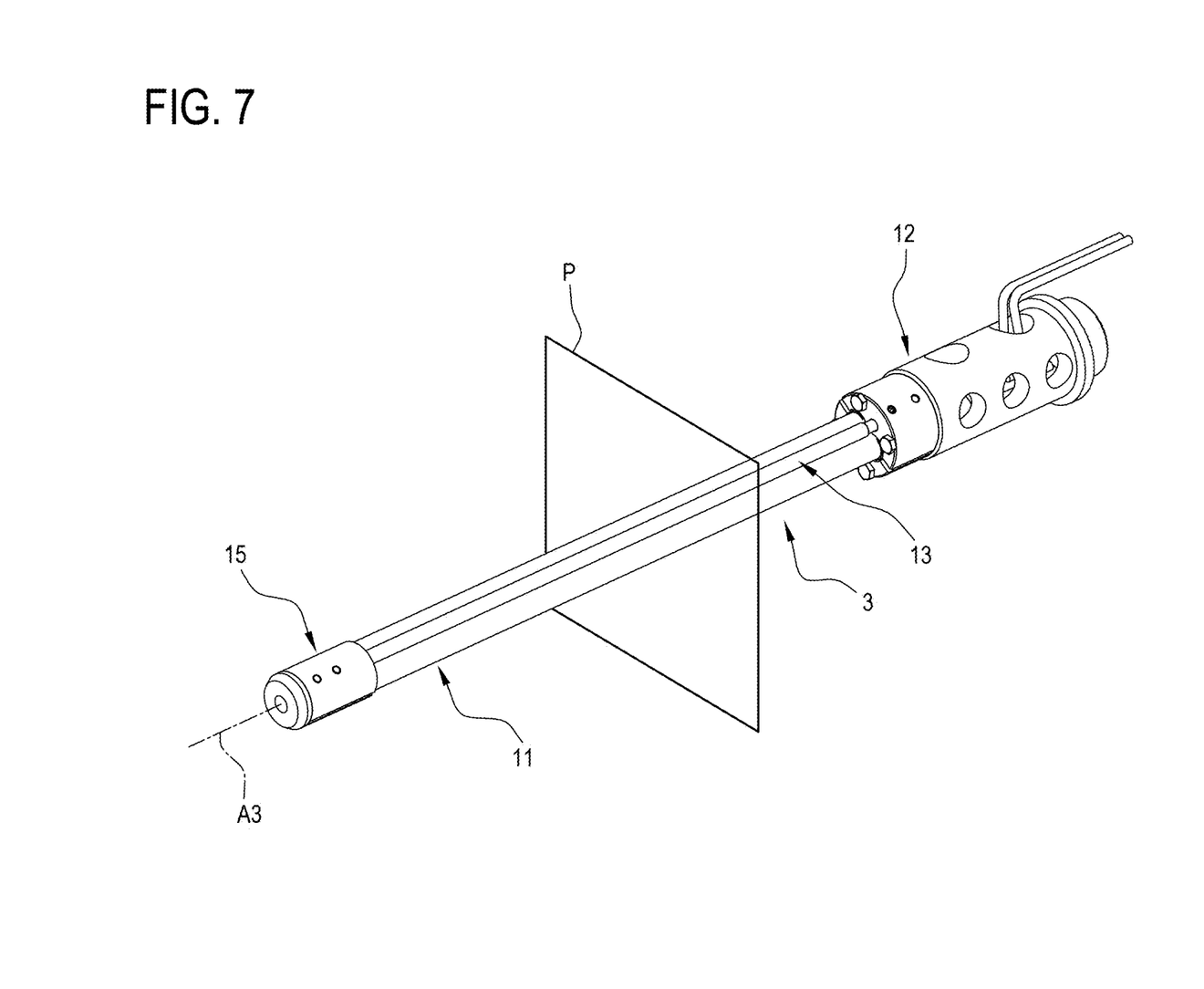
FIG. 7 is a schematic perspective view from above of a detail of the apparatus of the previous drawings.

The heating element 3, illustrated in detail in FIG. 7, comprises a short-wave radiating element 11.

Figure 8:
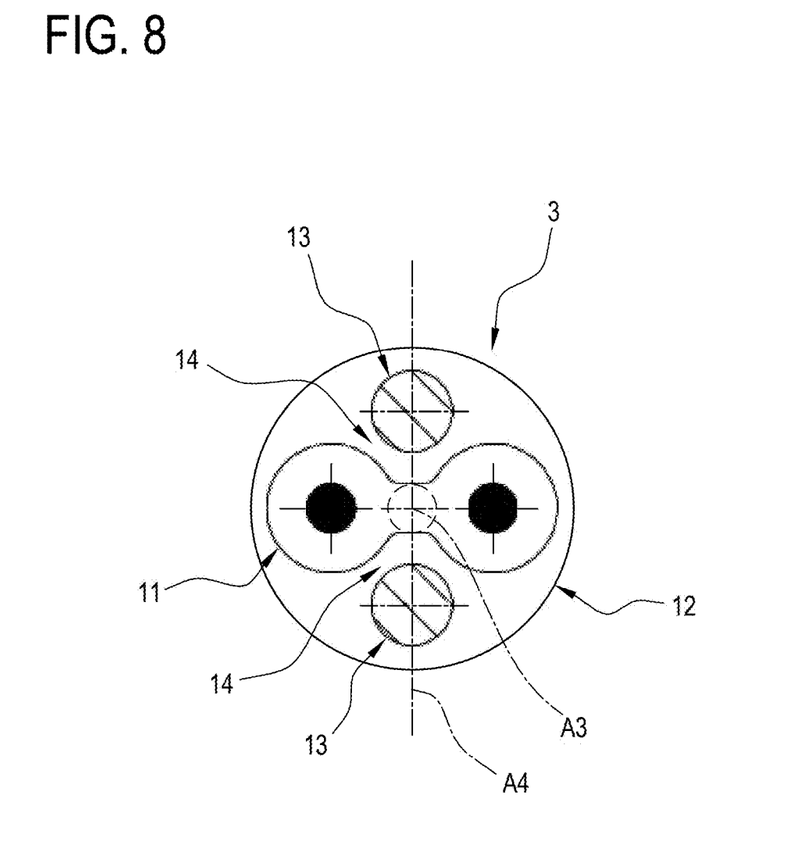
FIG. 8 is a cross section view along the plane P of FIG. 7.

Advantageously, the above-mentioned radiating element 11 is a lamp of twin type, having an axis A3 of longitudinal extension coinciding with that of the heating element 3 and a non-circular transversal cross section, shown in FIG. 8, having a predetermined axis of symmetry A4, at right angles to the axis of longitudinal extension. In other words, the term twin type is used to mean a lamp in which the transversal cross section has a two-lobed shape, as illustrated in FIG. 8 but also in FIGS. 10 and 11.

The axis A4 of symmetry is an axis of symmetry between the two lobes of the transversal cross-section of the lamp which constitutes the radiating element 11.

As illustrated in FIG. 7, the heating element 3 comprises a cylindrical block 12 for connecting to the disc 6, from which block 12 protrudes longitudinally the radiating element 11 defined by the twin type lamp.

From the connecting block 12 extend longitudinally, parallel to each other and to the axis A3, two rods 13 for supporting the twin type lamp, of which rods 13 only one is visible in FIG. 7.

FIG. 8, which is a transversal cross-section according to the plane P of FIG. 7, shows both rods 13.

With reference to FIGS. 7 and 8, the above-mentioned rods 13 are housed in respective cavities 14 defined along the twin type lamp.

The longitudinal cavities 14 are due to the two-lobed shape of the transversal cross-section of the twin type lamp, the cross section of which, projected along the axis A3, defines two symmetrical cavities.

More specifically, the rods 13 are located on opposite sides of the twin type lamp, symmetrically relative to the axis A3 of longitudinal extension.

As illustrated in FIG. 7, the heating element 3 has, at the relative distal end, a tip 15 for connection of the rods 13.

In known manner, the radiating element 11 is supplied with electric current, and transfers electromagnetic energy in the form of infra-red rays; radiations emitted mainly in the short wave range (0.9 µm-1.6 µm).

Advantageously, compared with the more common long and medium wave radiating units, used in the belling machines for PVC-U pipes, the short wave radiating elements 11 have a greater penetration capacity, that is to say, the energy associated with the electromagnetic waves is absorbed more in depth in the thickness of the wall of the pipe 2.

This feature favours the reaching of the softened state of the material, which is ideal for the subsequent process for forming bells, but without melting the material close to the inner cylindrical surface 2c of the pipe 2. In this way it is possible to transfer more thermal energy to the pipe 2 in less time.

The short wave radiating elements 11, commonly known also as infra-red lamps, are rectilinear tubes made of quartz glass, inside of which a tungsten filament is located which reaches temperatures in the order of 2000° C.-2400° C. These lamps have very short starting times, of less than two seconds, a feature which makes it possible to keep the radiating elements 11 de-energised during the phases in which the pipe 2 is not present in the oven, with obvious energy savings compared with traditional heaters with medium wave irradiation. In effect, in order for the medium wave heaters to reach the steady state emission, they must be switched ON for much longer so that, in the working process, they must remain always switched ON even in steps where the pipe 2 is not engaged in the oven.

In the special twin type configuration described above, the radiating element 11 is double, powered by a single conductor wire folded in a "U" shape at the end.

This configuration is advantageous since it allows for electrical connections located at a single end of the lamp. The fact of having both the connections at a single end allows the insertion of the heating element 3 into the pipe 2, leaving outside the pipe 2 the connectors and the power supply cables.

In the more simple configuration of the twin type lamp the radiating elements are also in the form of two tungsten filaments wound in the form of equal and parallel spirals.

Figure 9:
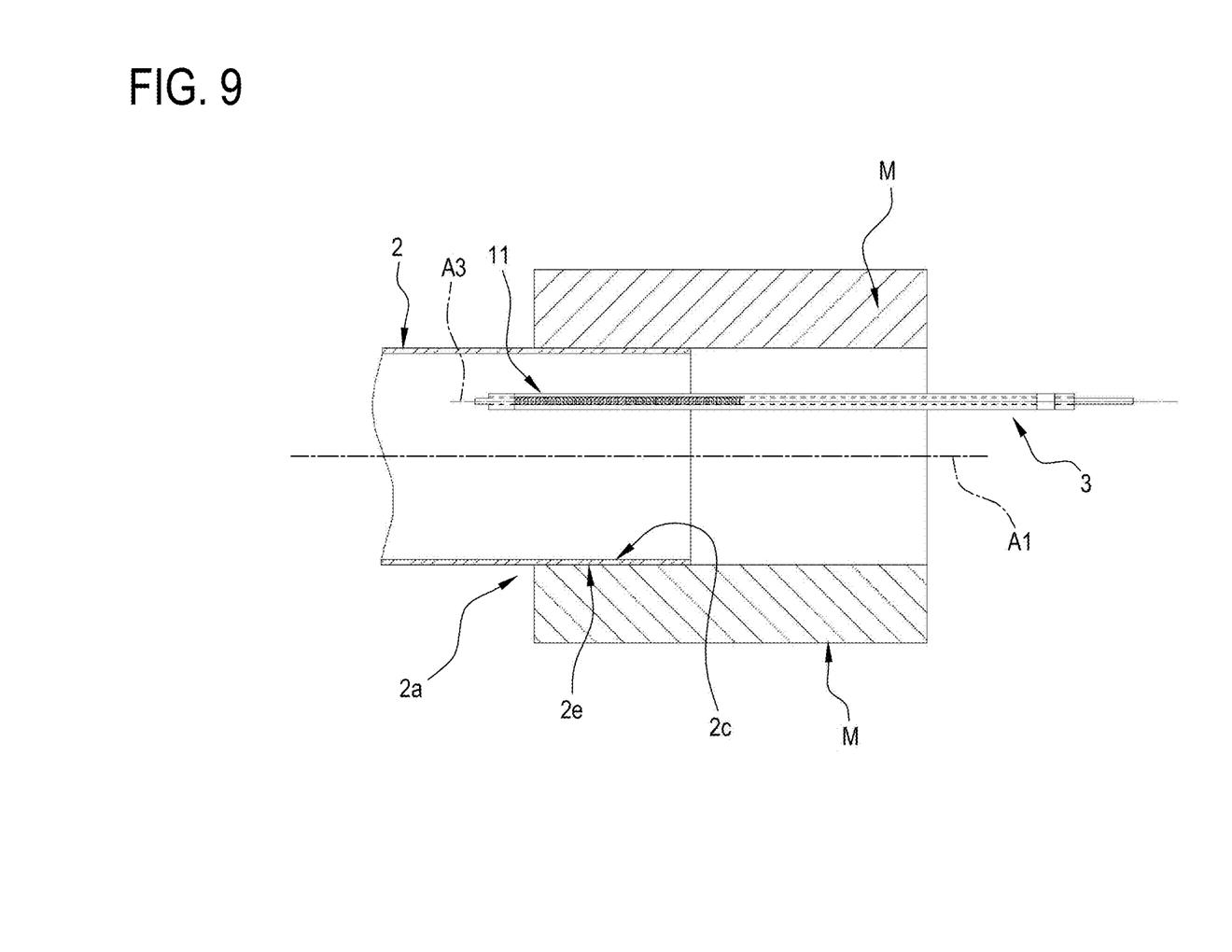
FIG. 9 is a schematic side view with some parts in cross-section, of a configuration of use of the detail of FIG. 7.

In the oven, that is to say, during the heating of the pipe, as shown by way of example in FIG. 9, the radiating element 11 is positioned with the relative axis A3 of longitudinal extension parallel to the central axis A1 of the pipe 2.

The axes A3 of longitudinal extension of the radiating element 11 and the axis A1 of the pipe are not coincident, but spaced in such a way that the radiating element 11 is close to the inside surface 2c of the pipe 2. Normally, the distance between the element 11 and the inner surface 2c is conveniently maintained in the range of between 2 mm and 30 mm.

The radiating element 11 will be kept closer to the inner surface 2c for small diameter pipes 2 and further away for large diameter pipes 2.

The internal heating radiation of the pipe 2 occurs by irradiation generated by the radiating element 11 and by hot air convection; in effect, as well as the irradiation, there is the transmission of heat to the pipe 2 by means of the hot air produced inside the pipe 2.

Figure 10:
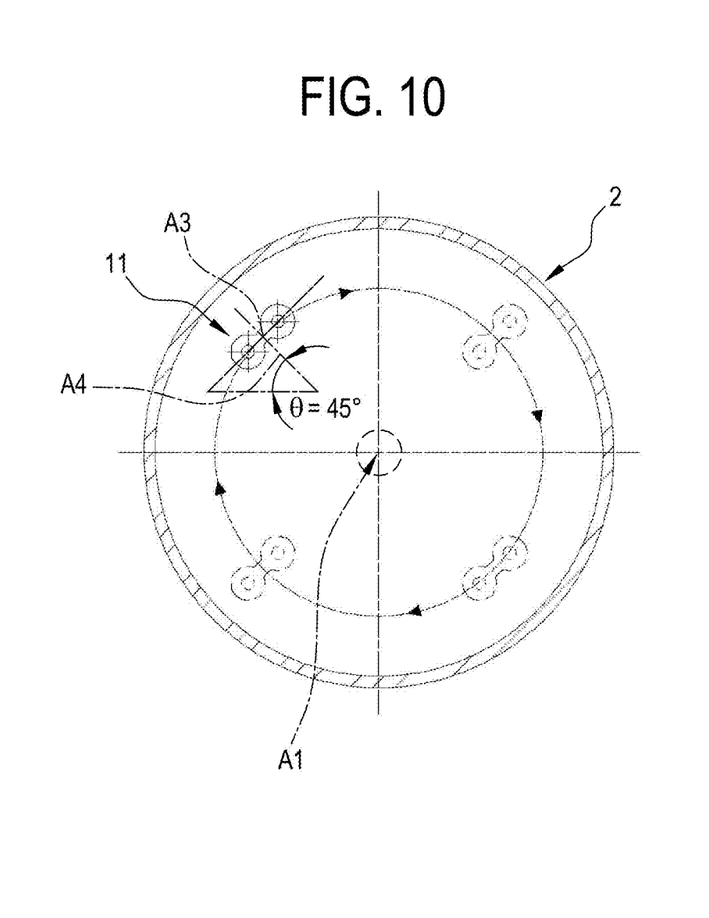
FIGS. 10 and 11 are respective schematic cross section views of the detail of FIG. 7 in two different configurations of use.
Figure 11:
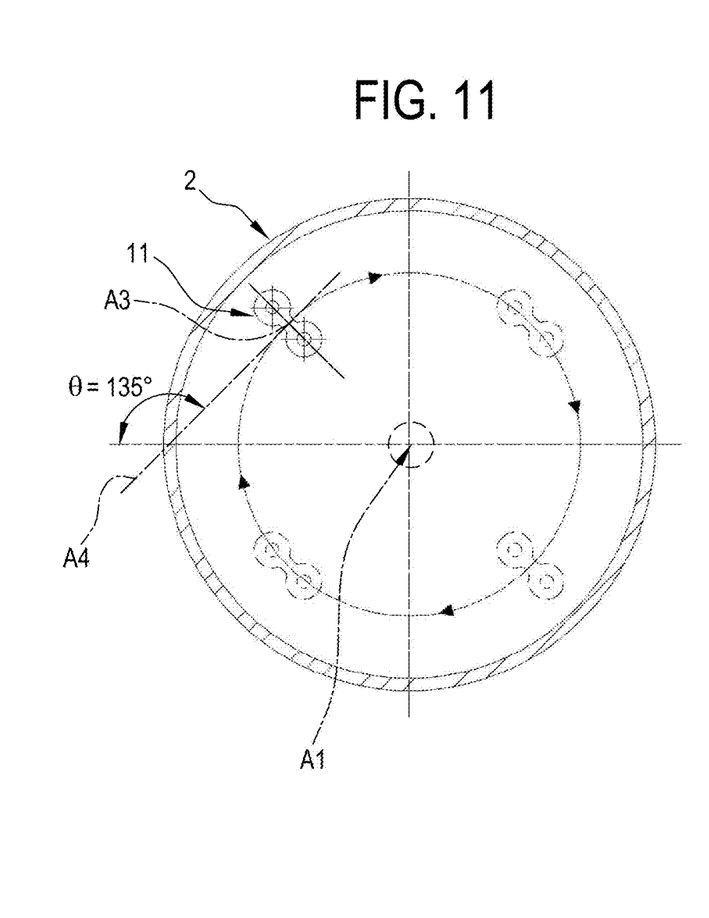

In use, as illustrated in FIGS. 9 to 11, in order to render uniform the heating around the circular surface 2c of the pipe 2 and in particular to oppose the convective effects which favour the heating in the upper part of the pipe 2, the radiating element 11 moving lamp is moved inside the pipe 2, at a constant speed, along a path of the axis A3 of longitudinal extension of the radiating element 11 which is circular and concentric with the central axis A1 of the pipe 2.

Again with the aim of rendering uniform the heating around the cylindrical inner surface 2c of the pipe 2, the movement device 4, defining for the apparatus 1 respective movement means, is configured in such a way that the radiating element 11, as illustrated in FIGS. 10 and 11, during its movement, maintains unchanged the relative orientation, that is to say, the radiating element 11 apparently does not rotate about the relative axis A3 of longitudinal extension.

In reality, the movement device 4 is configured for moving the radiating element 11 inside the pipe 2 according to a motion consisting of a movement of revolution with a trajectory concentric relative to the central axis A1 of the pipe 2 and a movement of rotation of the radiating element 11 about its axis A3 of longitudinal extension.

For the purposes of this description, the expression movement of revolution is used to denote the rotational of a body about a centre of rotation outside the body.

The rotation of element 11 about the relative axis is therefore such as to compensate for what occurs during the relative movement of revolution about the axis A1 of the pipe such that the radiating element 11 appears fixed relative to the rotation.

As clearly illustrated in FIGS. 10 and 11, the rotational movement of the radiating element 11 is such that the relative axis of symmetry A4 always remains parallel to itself during the movement of revolution.

There may be different constructional solutions suitable for maintaining unchanged the orientation θ of the lamp during the relative movement, where θ denotes the angle of inclination of the axis A4 of symmetry of the radiating element 11 relative to the horizontal.

An example embodiment is shown in FIG. 1.

In this solution, the radiating element 11 is supported with the relative cylindrical block 12 by the disc 6 using bearings not illustrated in detail.

The cylindrical block 12 is constrained in an eccentric fashion to the motor-driven disc 6 rotating about the relative axis A2. The disc 6 imposes the circular movement about the axis A1 of the pipe 2 to the block 12 and therefore also to the radiating element 11.

As described above, the articulated linkage 10 imposes, through the guide 9, a vertical orientation to the arm 8 during the rotation of the disc 6 about the relative axis A2.

Consequently, the cylindrical block 12 of the heating element 3, which is rotatably integral with the arm 8, ensures that the radiating element 11 also keeps unchanged the relative orientation, that is, the angle θ is maintained constant.

An embodiment such as that described lends itself easily to be adapted for machining in multi-belling mode by making a support with several couplings of the lamps positioned equidistant on a horizontal plane. FIGS. 3, 4, 5 and 6 illustrate a configuration for triple belling.

Experimental tests have shown that an excellent uniformity of heating around the inner cylindrical surface 2c of the pipe 2 is obtained by arranging the radiating element 11 with an orientation is such that its transversal axis of symmetry A4 forms a angle θ close to 45 sexagesimal degrees with the horizontal plane. A deviation of ±10° relative to the value of 45° does not significantly alter the efficiency in terms of uniformity of heating.

With this arrangement, with orientation θ unchanged, the radiating element 11, in its movement of revolution, "generates" a solid whose shape can be likened to a hollow oval-shaped cylinder.

Irrespective of the value of the angle of orientation θ selected, if the machine is equipped with two heating stations, with $\theta_1$ the orientation of the lamp in the first oven (that is, in the first heating station), the orientation of the radiating element 11 in the second oven (that is, in the second heating station) will be conveniently equal to $\theta_2 = \theta_1 + 90°$.

In general, in the case of the machine equipped with n heating stations, and assuming $\theta_1$ to be the orientation of the radiating element 11 in the first heating oven, the orientations $\theta_{the} \pm 10°$ of the radiating elements 11 will be adopted according to the law:

$$\theta_i = \theta_1 + (i-1) \times 180°/n \quad i=1 \ldots n \tag{a}$$

Preferably, in the case of a machine equipped with n heating stations, the preferential orientations $\theta i \pm 10°$ of the radiating elements 11 are adopted in accordance with the following law:

$$\theta_i = 45° + (i-1) \times 180°/n \quad i=1 \ldots n \tag{b}$$

Where the indicator i must not necessarily follow the order of arrangement of the ovens in the belling machine.

With the machine equipped with two or more heating ovens and internal heating apparatuses with radiating elements 11 positioned according to the law (a) or, preferably (b), at the end of the heating process there is a substantially uniform heating in the circumference of the surface 2c, even with small diameter pipes.

The uniformity of heating is also important in the axial direction of the pipe 2, and this may be obtained by suitably sizing the length and power of the radiating element 11.

The radiating element 11 advantageously faces all the portion 2a of pipe 2 engaged in the contact oven and must further extend beyond the end edge of the pipe 2 being heated by a quantity which will be greater the greater is the diameter of the pipe 2; in practice, this greater extension, which can be easily determined with experimental tests, is between 5% and 50% of the length of the portion 2a of pipe 2 to be heated.

With the same planned use of the pipes, the lengths the bells and, therefore, the corresponding lengths of the portions 2a of pipe 2 to be heated are smaller for the small diameter pipes 2 compared with large diameter pipes, but in the above-mentioned PP drain pipes, which are most commonly used, the change in length of the bell for the various diameters is limited and the apparatus described allows the use of the same radiating elements 11 for a wide range of diameters.

The radiating elements 11 consisting of the above-mentioned twin type lamps have an intrinsic fragility caused by the presence of the quartz bulbs and the connections applied to the quartz bulbs.

The two-lobed or "8" type shape of the twin type lamp lends itself to integrating the lamp in a structure for containing and supporting the lamp which is particularly robust and compact, such as the one defined by the above-mentioned rods 13.

The rods 13 are advantageously and preferably made of stainless steel.

The rods 13 together with the tip 15 define a structure for supporting and containing the radiating element 11 which has the advantage of not modifying significantly the overall dimensions of the heating element 3 to be inserted inside the pipe and not altering the effectiveness in uniformity of the heating.

This invention achieves the preset aims and brings important advantages.

The inner heating elements having short wave radiating elements in the form of twin type lamps are more efficient compared with the traditional medium wave heaters and relative to the inner metal heating elements, to the point that it is possible to make belling machines with two heating stations with a production capacity equal to or greater than that of belling machines equipped with three or four ovens of the conventional type, with evident benefits in terms of overall size and complexity of the belling machine.

The internal short wave radiating elements allow a reduced energy consumption as they can be switched OFF during the working cycle steps where the oven is disengaged from the pipe. (The energy saving relative to the traditional systems is greater than 40%).

The heating efficiency of the short wave radiating elements, compared with conventional systems, due to the greater penetrative capacity of the short wave, is particularly marked when processing pipes of large-average thickness (4-9 mm); consequently, the production capacity of the belling machines during the processing of these pipes is increased even further.

A further advantage is connected to the rotation of the internal heating elements combined with their switching OFF during the working cycle steps where the oven is disengaged from the pipe, which is favourable for avoiding overheating of the radiating element and of the relative electrical connectors, which is a situation which often causes rapid failure of the medium wave heaters which, otherwise, must always remain switched ON.

Yet another advantage and connected to the constructional configuration of the inner heating elements which lends itself to making heating ovens for machining pipes with small diameters in multi-belling mode without penalising the overall dimensions of the heating oven, which is normally sized to machine in a single belling mode the pipe with the greatest diameter planned for the belling machine.

Moreover, for the same diameter of the pipe being processed, it is not necessary to replace parts of the internal heating element, whilst it is sufficient to modify the relative eccentric position relative to the disc which supports it, moving it towards the centre of the pipe with an increase in thickness, or vice versa. The modification of the position of the internal heating element may be easily automated.

Another advantage linked with the invention is due to the fact that, in the most common applications intended for drain pipes, the radiating elements are the same and need not, therefore, be replaced if the diameter of the pipe remains within normal dimensional fields.

The invention claimed is:

1. An apparatus for internal heating of end portions of pipes made of thermoplastic material having a central axis, the apparatus comprising:
    a frame,
    a holding mechanism configured for holding a pipe made of thermoplastic material with respect to the frame,
    a rotatable member rotatably connected to the frame about the central axis,
    a bearing ecentrically mounted to the rotatable member,
    a heating element rotatably connected to the rotatable member via the bearing such that rotation of the rotatable member causes rotation of the heating element about the central axis and such that an angular orientation of the heating element with respect to the rotatable member is changeable as the rotatable member rotates, the heating element configured to be inserted at least partially inside an end portion of the pipe for heating an inner cylindrical surface of the end portion, the heating element comprising an infrared radiating element configured to face at least partially the inner cylindrical surface, the radiating element having an axis of longitudinal extension,
    a movement device, including a linkage member, connected between the frame and the rotatable member and configured for moving the radiating element inside the pipe according to a motion path including:
a movement of revolution with a trajectory which is concentric relative to a central axis of the pipe, and
a movement of rotation of the radiating element about the axis of longitudinal extension,
wherein the radiating element has a non-circular transversal cross section having a predetermined axis of symmetry at right angles to the axis of longitudinal extension, and also
wherein the movement of rotation of the radiating element is such that the axis of symmetry always remains parallel with itself during the movement of revolution.

2. The apparatus according to claim 1, wherein the axis of symmetry is inclined, relative to a horizontal plane, by an angle θ of between 35 sexagesimal degrees and 55 sexagesimal degrees.

3. The apparatus according to claim 2, wherien the angle θ is equal to approximately 45 sexagesimal degrees.

4. The apparatus according to claim 1, and further comprising a plurality of the heating element for simultaneously heating a plurality of end portions of pipes made from thermoplastic material, the movement device being configured to move the respective radiating elements integrally to each other according to the motion path.

5. A machine for processing pipes made of thermoplastic material comprising n heating stations, each of the heating stations comprising the apparatus according to claim 1, wherein an angle of inclination to a horizontal plane of the axis of symmetry of the radiating element of i-th of the n stations is equal, in sexagesimal degrees, to $$\theta_i \pm 10°$$

where $$\theta_i = \theta_1 + (i-1)\frac{180°}{n}$$

and
$\theta_1$ being the angle of inclination of the radiating element of a first one of the n heating stations.

6. The apparatus according to claim 1, wherein the radiating element is configured as a twin lamp with a two-lobed transversal cross section.

7. The apparatus according to claim 6, wherein the heating element comprises at least one rod supporting the twin lamp, the supporting rod extending parallel to the axis of longitudinal extension, and positioned in a longitudinal cavity defined along the twin lamp.

8. The apparatus according to claim 7, wherein the at least one rod includes two rods supporting the twin lamp, the two rods being located on opposite sides of the twin lamp, symmetrically relative to the axis of longitudinal extension.

9. The apparatus according to claim 1, wherein the linkage member is an articulated parallelogram.

10. The apparatus according to claim 9, wherein the movement device further comprises an elongated guide with a sliding arm slideably mounted on the elongated guide, wherein a first portion of the articulated parallelogram is mounted to the frame and an opposite second portion of the articulated parallelogram is mounted to a first end of the elongated guide, the sliding arm being mounted to the heating element to reciprocate along the elongated guide as the rotatable member rotates, the articulated parallelogram maintaining a same angular orientation of the elongated guide with respect to the frame throughout a range of rotation of the rotatable member while allowing a side-to-side movement of the elongated guide with respect to the frame throughout the range of rotation of the rotatable member.

11. The apparatus according to claim 1, wherein the movement device further comprises an elongated guide with a sliding arm slideably mounted on the elongated guide, wherein a first portion of the linkage member is mounted to the frame and an opposite second portion of the linkage member is mounted to a first end of the elongated guide, the sliding arm being mounted to the heating element to reciprocate along the elongated guide as the rotatable member rotates, the linkage member maintaining a same angular orientation of the elongated guide with respect to the frame throughout a range of rotation of the rotatable member while allowing a side-to-side movement of the elongated guide with respect to the frame throughout the range of rotation of the rotatable member.

12. The apparatus according to claim 1, and further comprising a block connecting the heating element to the bearing.

13. A method for internal heating of end portions of pipes made of thermoplastic material having a central axis, comprising the following steps:
providing an apparatus comprising:
a frame,
a holding mechanism configured for holding a pipe made of thermoplastic material with respect to the frame,
a rotatable member rotatably connected to the frame about the central axis,
a bearing ecentrically mounted to the rotatable member,
a heating element rotatably connected to the rotatable member via the bearing such that rotation of the rotatable member causes rotation of the heating element about the central axis and such that an angular orientation of the heating element with respect to the rotatable member is changeable as the rotatable member rotates, the heating element configured to be inserted at least partially inside an end portion of the pipe for heating an inner cylindrical surface of the end portion, the heating element comprising an infrared radiating element configured to face at least partially the inner cylindrical surface, the radiating element having an axis of longitudinal extension,
a movement device, including a linkage member, connected between the frame and the rotatable member and configured for moving the radiating element inside the pipe according to a motion path including:
a movement of revolution with a trajectory which is concentric relative to a central axis of the pipe, and
a movement of rotation of the radiating element about the axis of longitudinal extension,
wherein the radiating element has a non-circular transversal cross section having a predetermined axis of symmetry at right angles to the axis of longitudinal extension, and also
wherein the movement of rotation of the radiating element is such that the axis of symmetry always remains parallel with itself during the movement of revolution,
inserting at least partially the heating element inside the end portion of the pipe for heating the inner cylindrical surface of the end portion, moving the radiating element inside the pipe according to the motion path.

14. The method according to claim 13, and further comprising providing that the linkage member is an articulated parallelogram.

15. The method according to claim 14, and further comprising providing that the movement device further comprises an elongated guide with a sliding arm slideably mounted on the elongated guide, wherein a first portion of the articulated parallelogram is mounted to the frame and an opposite second portion of the parallelogram is mounted to a first end of the elongated guide, the sliding arm being mounted to the heating element to reciprocate along the elongated guide as the rotatable member rotates, the articulated parallelogram maintaining a same angular orientation of the elongated guide with respect to the frame throughout a range of rotation of the rotatable member while allowing a side-to-side movement of the elongated guide with respect to the frame throughout the range of rotation of the rotatable member.

16. The method according to claim 13, and further comprising providing that the movement device further comprises an elongated guide with a sliding arm slideably mounted on the elongated guide, wherein a first portion of the linkage member is mounted to the frame and an opposite second portion of the linkage member is mounted to a first end of the elongated guide, the sliding block being mounted to the heating element to reciprocate along the elongated guide as the rotatable member rotates, the linkage member maintaining a same angular orientation of the elongated guide with respect to the frame throughout a range of rotation of the rotatable member while allowing a side-to-side movement of the elongated guide with respect to the frame throughout the range of rotation of the rotatable member.

17. The method according to claim 13, and further comprising providing a block connecting the heating element to the bearing.

* * * * *